Nov. 14, 1961 R. N. RHODES 3,009,111
SIGNAL TRANSLATING SYSTEM
Filed Jan. 2, 1957 4 Sheets-Sheet 1
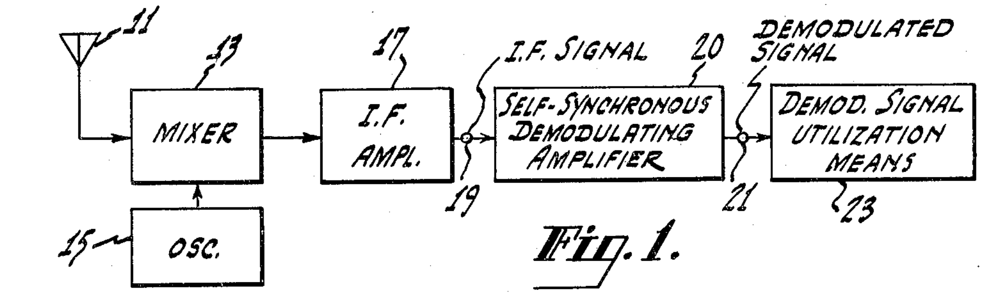
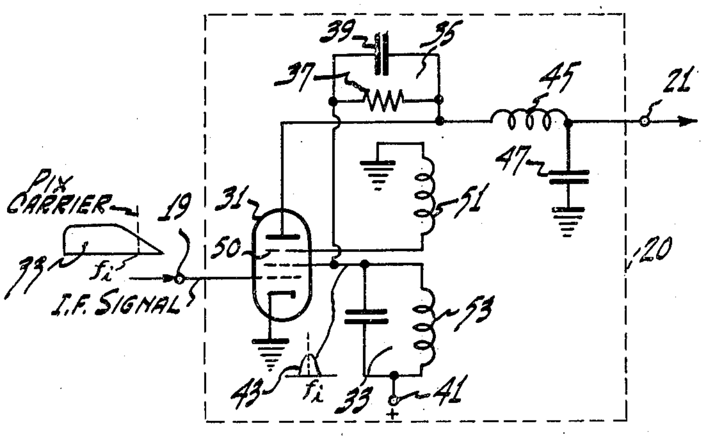
Fig. 2.
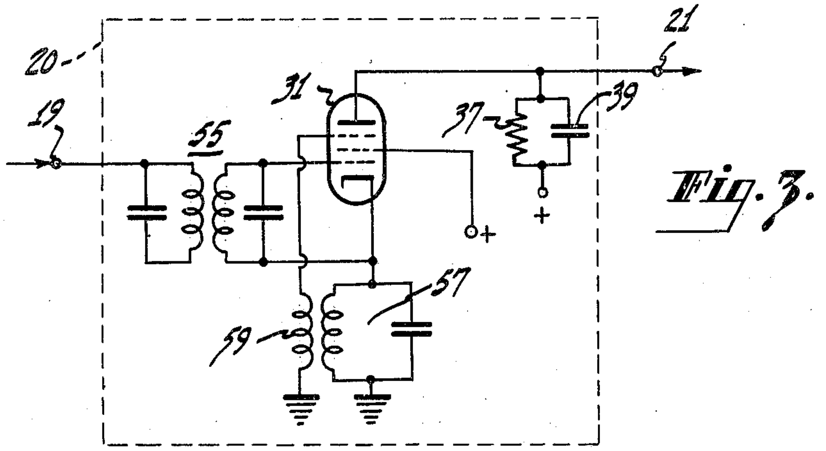
INVENTOR.
ROLAND N. RHODES
BY
[signature]
ATTORNEY INVENTOR.
ROLAND N. RHODES
BY [signature]
ATTORNEY INVENTOR.
ROLAND N. RHODES
BY [signature]
ATTORNEY

SIGNAL TRANSLATING SYSTEM

Filed Jan. 2, 1957 4 Sheets-Sheet 4

INVENTOR.
ROLAND N. RHODES
BY
[signature]
ATTORNEY

United States Patent Office 3,009,111

Patented Nov. 14, 1961

3,009,111
SIGNAL TRANSLATING SYSTEM

Roland N. Rhodes, Levittown, Pa., assignor to Radio Corporation of America, a corporation of Delaware Filed Jan. 2, 1957, Ser. No. 632,098
13 Claims. (Cl. 329—50)

The present invention relates to improved circuits for demodulating amplitude modulated carriers of the type where signal information is transmitted double sideband in the amplitude modulated carrier and of the type where signal information is transmitted in a vestigial sideband such as is employed in television transmission systems.

An important type of demodulating system, which may be utilized to demodulate information from double sideband and vestigial sideband types of amplitude modulated carriers, is the so-called synchronous detection type of detector or demodulator. A synchronous demodulator develops a synchronous demodulating signal derived from either the carrier of the transmitted amplitude modulated wave or the carrier and also sideband information adjacent to the carrier of the modulated wave and mixes both the amplitude modulated carrier and the synchronous demodulating signal in a signal mixing device, thereby demodulating the signal information which is transmitted by the amplitude modulated wave. Synchronous demodulators have the advantage of producing what is known as "in-phase" demodulation, that is, the demodulation of only that information which is in antiquadrature, in phase or in phase opposition with respect to the phase of the carrier. In other words, substantially the only information which a synchronous demodulator devices from the carrier wave is that which is represented by a carrier phase which lies along the in-phase axis of the carrier (i.e., either the same or opposite phase). In-phase demodulation is of particular importance in systems which use, for example, vestigial sideband modulation, inasmuch as vestigial sideband modulation has a tendency to produce not only infomation which is in-phase or antiquadrature with the carrier of the modulated wave but also information which is in quadrature with the carrier. The quadrature information is comprised of distortion components, which, if demodulated with the in-phase components, would serve to distort the demodulated signal or detract from the readability of the demodulated signal. Synchronous demodulators now known in tthe art require that the circuits which supply both the amplitude modulated carrier and also the synchronous demodulating signal to a signal mixing device be circuits of high gain. This is due to the fact that in synchronous demodulators now known in the art, little or no gain is possible, without utilizing oscillation techniques in conjunction with the synchronous demodulation process.

It is therefore an object of the invention to provide an improved synchronous demodulator of high gain.

It is a further object of the invention to provide an improved synchronous demodulator circuit which does not require an oscillating circuit.

It is a further object of the invention to provide a synchronous demodulating circuit which will also function as an amplifier circuit for the amplitude modulated carrier to be demodulated.

It is a still further object of the invention to provide a high gain synchronous demodulator circuit which eliminates the need of at least one amplifier stage in the intermediate frequency amplifier of a superheterodyne type of receiver.

According to the invention, an amplitude modulated carrier, such as an intermediate frequency carrier developed in a superheterodyne adapted to receive either double sideband AM broadcasting or vestigial sideband television signals, is applied to an amplifier device, hereinafter referred to as a self-synchronous demodulating amplifier wherein the amplitude modulated carrier is first amplified into an output circuit. Signal deriving means are coupled to the output circuit to produce a synchronous demodulating signal constituting either the carrier of the amplified amplitude modulated carrier or a group of signals comprising the amplified carrier and also amplified sidebands located adjacent to that carrier. The synchronous demodulating signal is thereupon reintroduced back at one or more points into the electron stream of the amplifier device using an arrangement to prevent oscillations from being developed. Signal mixing between the amplitude modulated carrier being amplified in the electron stream and the synchronous demodulating signal introduced into the electron stream is thereby provided, thereby producing demodulated signal information in the electron stream; the demodulated signal information is developed in a circuit responsive to signal information produced in the electron stream.

In one form of the invention, electrons modulated by the amplitude modulated carrier to be demodulated, are passed to either or both of a pair of output electrodes or anodes, with the intensity of the electrons passed to each output electrode capable of being controlled. The output electrodes are coupled together to have a common point through which current from each output electrode flows; an amplified amplitude modulated carrier is produced at both output electrodes. A synchronous demodulating signal is derived from the amplified amplitude modulated carrier developed at one or both of the output electrodes; one polarity of the synchronous demodulating signal is used to demodulate the electrons passing to one output electrode in one polarity and a second polarity of the demodulating signal is used to demodulate the electrons passing to the other output electrode; the current derived from both output electrodes and passed through the common point therefore does not vary with the demodulating signal. Signal mixing between the amplified amplitude modulated carrier information and synchronous demodulating signal information conveyed by the electrons produces demodulated information at one or more points in circuits common to one or both of the output electrodes.

In one type of synchronous demodulator circuit of the present invention, different polarities of demodulated signal information are obtainable at each of the output electrodes of the form of the invention described above.

Other and incidental objects of the invention will become apparent upon the reading of the following specification and a study of the figures wherein:

FIGURE 1 is a block diagram of a superheterodyne circuit which uses a self-synchronous demodulating amplifier of the present invention;

FIGURES 2 through 8 are schematic diagrams of different forms of self-synchronous demodulating amplifiers of the present invention;

FIGURE 9 is a diagram of a color television receiver which utilizes a self-synchronous demodulating amplifier of the present invention to demodulate luminance, chrominance, and audio-modulated carrier information;

*A typical receiver circuit*

Figure 4:
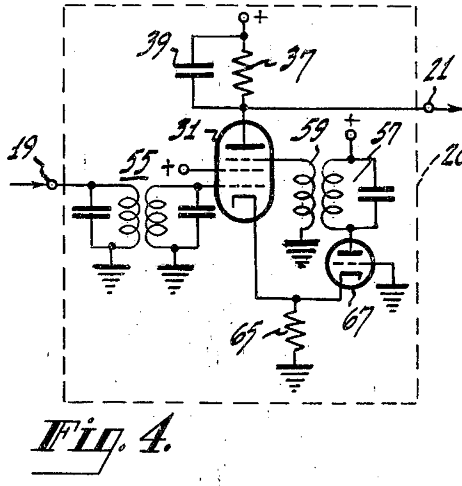

Before entering upon a description of the various forms of self-synchronous demodulating amplifiers of the present invention which will be described later in the specification, consider first some aspects of signal receivers which are pertinent to an appreciation of the benefits of the present invention. In many types of signal receivers which are used in commercial broadcasting and in receivers for receiving signals of the radar type, superheterodyne circuits are employed. The superheterodyne circuit is uniquely adaptable for providing reception of signal information with high gain and maximum sensitivity and selectivity.

A typical superheterodyne receiver circuit, using a detecting means of the present invention, is shown in FIGURE 1. In the circuit of FIGURE 1 an incoming signal to be demodulated, that is, an amplitude modulated carrier wherein modulating signal information is either transmitted double sideband or is transmitted vestigial sideband, is received at the antenna 11 and applied therefrom to the mixer 13. An oscillator 15 develops a local oscillator signal which is mixed with the incoming amplitude modulated carrier to heterodyne the amplitude modulated carrier to an intermediate frequency. The intermediate frequency amplitude modulated carrier is thereupon amplified in the I.F. amplifiers 17 and applied therefrom to the self-synchronous demodulating amplifier 20 of the present invention. The intermediate frequency amplitude modulated carrier, denoted the I.F. signal, is applied to the self-synchronous demodulating amplifier 20 by way of the terminal 19.

The self-synchronous demodulating amplifier 20 produces a demodulated signal at the output terminal 21. The demodulated signal may constitute broadcast sound information, television, video, and synchronizing information, or radar information. The demodulated signal is then applied from terminal 21 to the demodulated signal utilization means 23.

Using circuits of types to be described in the following specification, a self-synchronous demodulating amplifier will be seen to demodulate the I.F. signal with the feature that (A) the I.F. signal is amplified in the synchronous demodulator before demodulation, (B) only sideband component information which is in-phase with the carrier of the incoming signal is demodulated, thereby eliminating much distortion and noise information, and also (C) the demodulated signal information is developed at high level.

The circuit of FIGURE 1 shows a self-synchronous demodulating amplifier 20 as a part of a superheterodyne type of receiver; it is to be understood by one skilled in the art that the use of the present invention is not limited to this type of receiver but is actually broadly useful in any circuit which requires the demodulation of a carrier which is modulated with signal information.

*Single-tube, self-synchronous demodulating amplifiers*

FIGURE 2 is a schematic diagram of one form of a self-synchronous demodulating amplifier of the present invention which utilizes a single tube.

An I.F. signal is applied to the control grid of a multigrid tube 31. The I.F. signal is hereinafter considered to represent a vestigial sideband type of signal such as a television signal; the I.F. signal has a general frequency band configuration signal shown by the diagram 33. The vestigial sideband signal constituting the I.F. signal has a carrier frequency at $f_1$ (denoted in the figure as pix carrier). The I.F. signal is amplified in the electron stream of the tube 31 thereby developing an amplified I.F. signal at the anode of that tube.

The anode circuit of tube 31 includes a resonant circuit 33 which is connected in series with a shunt circuit 35 consisting of a resistance 37 and condenser 39 in parallel. The resonant circuit 33 in tuned to the frequency $f_1$ and has a bandwidth which is large enough to include important side frequency components on both sides of $f_1$ in the I.F. signal. The anode circuit consisting of the serially connected resonant circuit 33 and the shunt circuit 35 is connected between a potential terminal 41 and the anode of tube 31. The amplified I.F. signal, passing through the resonant circuit 33, will develop across this circuit a small band of signal components included in the frequency band illustrated by curve 43; this band of components, which may be limited to only the carrier component constitutes a synchronous demodulating signal which is developed from the amplified I.F. signal.

The synchronous demodulating signal developed across the resonant circuit 33 is induced into the coil 51 and thereupon applied to the third grid 50 of the tube 31; the I.F. signal being amplified in the electron stream of tube 31 and the synchronous demodulating signal derived from the amplified I.F. signal and reintroduced into the electron stream at the third grid 50 of tube 31, will be mixed therein to provide a demodulated signal across the resistance 37 constituting one portion of the anode load 35. The condenser 39 is used to by-pass I.F. signal information from the anode to the resonant circuit 33 with a minimum of attenuation.

The synchronous demodulating signal developed across the resonant circuit 33 will comprise a signal which is substantially in-phase with the carrier component of the vestigial sideband signal. Signal mixing of this synchronous demodulating signal and the vestigial sideband signal constituting the I.F. signal, will produce demodulation of only those components of the I.F. signal which are inphase with the carrier and will reject those components which are in phase quadrature with the picture carrier. The self-synchronous demodulating amplifier of FIGURE 2 is therefore an ideal synchronous demodulator for television signals.

The demodulated signal information which is developed across the resistance 37 is coupled to the output terminal 21 by way of the RF choke 45. The RF choke 45 provides the function of isolating the I.F. signal from the output terminal 21. The by-pass condenser 47 which is connected between the output terminal end of the RF choke 45 and ground serves the purpose of by-passing to ground any high frequency components in the I.F. signal frequency range which might pass through the RF choke 45.

The circuit of the invention shown in FIGURE 2 has been shown to be a circuit wherein an I.F. signal is amplified; a portion of the amplified I.F. signal constituting the I.F. signal carrier and a small number of adjacent side frequencies and comprising the synchronous demodulating signal is then reintroduced into the amplifying device wherein it is mixed with the I.F. signal to produce demodulated signal information.

Hereinafter in the specification, the synchronous demodulating signal will be assumed to comprise either a carrier signal alone which has been derived from an amplified I.F. signal, or an amplified modulated carrier and an adjacent group of side frequencies which form a symmetrical band of components.

The self-synchronous demodulating amplifier 20 of FIGURE 2 has an additional feature which provides for increased stability of the demodulator and which prevents the self-synchronous demodulating amplifier 20 from breaking into oscillation. For optimum operation of the synchronous demodulating amplifier 20 of FIGURE 2, it is desirable that the synchronous demodulating signal which is applied from the resonant circuit 33 to the third grid 50 of the tube 31 not be reamplified in the electron stream of tube 31, otherwise oscillations will result.

The synchronous demodulating signal, provided at the third grid 50 of tube 31, is prevented from being amplified in virtue of the fact that the potential of the third grid 50 also controls the distribution of current between the anode and the screen grid; that is, as the synchronous demodulating signal decreases the potential of the third grid 50, a reduced amount of current passes to the anode and an increased amount of current passes to the screen grid. As the synchronous demodulating signal increases the potential of the third grid 50, more current will pass to the anode and less will pass to the screen grid. By proper choice of the amplitudes of the voltages applied to the anode, the screen grid, and the third grid 50, the electron stream, varying in accordance with synchronous demodulating signal information in the region between the anode and the screen grid, is distributed between the anode and the screen grid; the average current to the anode relative to the synchronous demodulating signal is therefore maintained substantially constant. When this condition is achieved, it is relatively impossible for the self-synchronous demodulating amplifier to break into oscillation.

In a preferred mode of operation of the self-synchronous demodulating amplifier of FIGURE 2, the voltage applied to the third grid 50, representing the synchronous demodulating signal, is caused to be sufficiently large so that the currents to the anode and to the screen grid of tube 31 are substantially square pulses. Thus the synchronous demodulating signal is amplitude limited or clipped and the amplitude of the demodulated signal will therefore be independent of fluctuations or variations in the amplitude of the synchronous demodulating signal.

Figure 12:
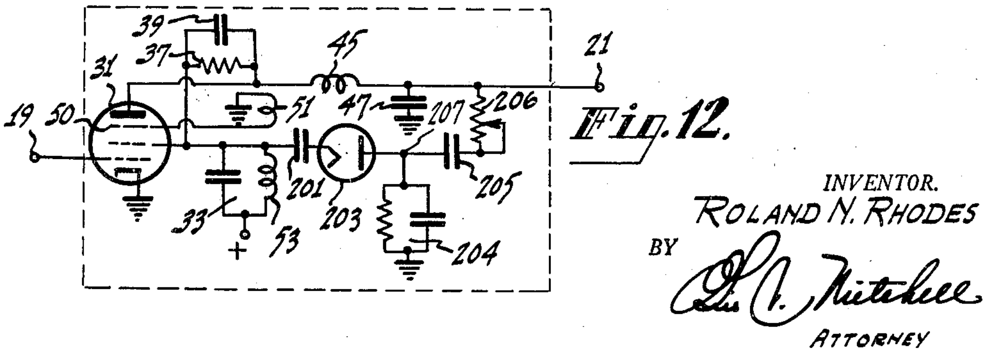
FIGURE 12 is a schematic diagram of a carrier-balanced, self-synchronous demodulating amplifier.

The circuits herein described with the exception of the circuit of FIGURE 12 perform the function of amplitude limiting the synchronous demodulating signal in the demodulating amplifier. It is to be understood that the above amplitude limiting can be performed in a separate clipping circuit.

FIGURE 3 is a schematic diagram of another form of self-synchronous demodulating amplifier 20. In the circuit 20 of FIGURE 3, the I.F. signal is applied by way of the transformer 55 between the first grid and the cathode of the tube 31. A resonant circuit 57 is coupled between the cathode of tube 31 and ground. Amplified I.F. signal components are developed across the resonant circuit 57. Since the cathode current of a pentode tube is relatively independent of voltage applied to the third grid, then an amplified synchronous demodulating signal, which is coupled from the resonant circuit 57 by way of coil 59 to the third grid of tube 31 and applied thereto with an amplitude sufficient to cause limiting of this signal, provides signal mixing of the I.F. signal being amplified with the amplitude limited synchronous demodulating signal in the electron stream of tube 31 thereby producing a demodulated signal across the anode resistance 37 and at the output terminal 21.

The tube 31 and its associated circuitry, in FIGURE 3, can be considered to function as a cathode loaded amplifier for the I.F. signal; the synchronous demodulating signal which is developed across the resonant circuit 57 is obtained from an amplified I.F. signal which has experienced a power gain.

*Two-tube, self-synchronous demodulating amplifiers*

FIGURE 4 is a schematic diagram of a self-synchronous demodulating amplifier which provides power gain for the I.F. signal and which both produces a synchronous demodulating signal in a unique fashion and also provides for an average current of constant magnitude in the output circuit responsive to the synchronous demodulating signal.

The I.F. signal which is applied by way of the transformer 55 to the control grid of tube 31 is developed across the cathode resistance 65. A power gain of the I.F. signal is achieved at that point. The amplified I.F. signal developed across the cathode resistance 65 is then applied to the cathode of the triode 67 whose control grid is coupled to ground and whose anode is coupled to a resonant circuit 57 which is sharply resonant at the frequency of the carrier of the I.F. signal. A synchronous demodulating signal is thereby developed across the resonant circuit 57 and coupled at high level (to cause amplitude limiting) therefrom by way of the coil 59 to the third grid of the tube 31. Inasmuch as the current through tube 31 which represents the synchronous demodulating signal is controlled by the synchronous demodulating signal voltages developed in opposite phases at both the cathode and the third grid of tube 31, the current passing to the anode of tube 31 does not include variations representative of the synchronous demodulating signal so that oscillations are not produced. Signal mixing between the amplified I.F. signal and the synchronous demodulating signal information applied to the third grid of tube 31 and amplitude limited therein thereupon takes place in the electron stream of tube 31 with the demodulated signal developed across the load anode resistance 37 and therefore at the output terminal 21.

Figure 5:
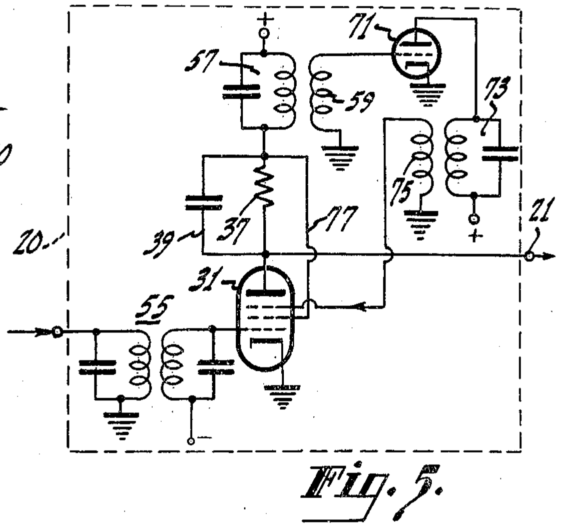

FIGURE 5 is a circuit diagram of another form of the present invention. In the self-synchronous demodulating amplifier 20 of this FIGURE 5, the I.F. signal is applied to the first control grid of the tube 31 by way of the bandpass transformer 55. The anode circuit of the tube 31 consists of the resonant circuit 57, tuned to I.F. carrier frequency, which is in series with the resistance-condenser circuit including the anode resistor 37 shunted by the condenser 39. Inasmuch as the resistor 37 is shunted by the condenser 39, the I.F. carrier and also the sideband components adjacent to the carrier of the I.F. signal are developed across the resonant circuit 57, to produce a synchronous demodulating signal across this circuit 57. The synchronous demodulating signal is coupled by way of the coil 59 to the control grid of the tube 71 which in turn amplifies the synchronous demodulating signal into the resonant circuit 73; the amplified synchronous demodulating signal is induced in the coil 75 which is coupled to the resonant circuit 73 and applied therefrom at high level to the third grid of tube 31 to cause amplitude limiting of this signal therein. The synchronous demodulating signal, applied to the third grid of tube 31, is therein mixed with the I.F. signal being amplified in tube 31, so that demodulated signal information is developed across the anode resistor 37 and applied therefrom to the output terminal 21.

The self-synchronous demodulating amplifier of FIGURE 5 is prevented from breaking into oscillation by coupling current representing I.F. signal information from both the anode and the screen grid of tube 31 to the resonant circuit 57. The synchronous demodulating signal information developed at the third grid of tube 31 not only mixes with the I.F. signal therein but also controls the distribution of I.F. signal information current between the anode and screen grid of tube 31 with the sum current maintained constant, whereby the synchronous demodulating signal information is prevented from being reintroduced into the resonant circuit 57 thereby preventing oscillations from being developed.

*Push-pull, self-synchronous demodulating amplifier*

Figure 6:
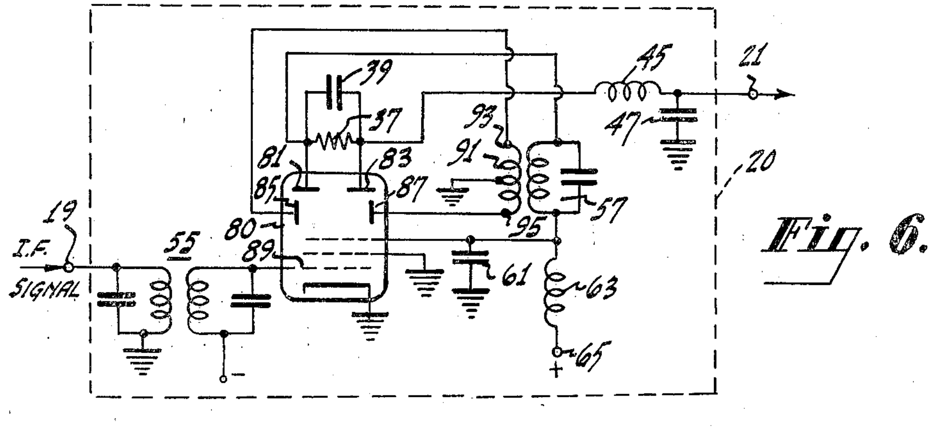

FIGURE 6 is a push-pull, self-synchronous demodulating amplifier 20 of the present invention which operates in a unique manner to both develop demodulated signal information and to also discourage oscillation by causing the average anode circuit current to be relatively free of demodulating signal information. In the form of self-synchronous demodulating amplifier illustrated in FIGURE 6, a beam deflection tube 80 is employed. The beam deflection tube 80 has a pair of anodes 81 and 83 and a pair of deflection plates 85 and 87. A current furnished by a common cathode, and a series of control grids which are capable of controlling the current from the common cathode is caused to be beamed to either of the anodes 81 or 83 depending upon the potentials between the deflection plates 85 and 87.

The push-pull, self-synchronous demodulating amplifier 20 of FIGURE 6 is caused to be operative using the following circuits: The I.F. signal is applied by way of the input terminal 19 and the bandpass amplifier 55 to the first control grid 89 of the beam deflection tube 80.

A resistance 37 is connected between the anodes 81 and 83; the condenser 39 is coupled in shunt with the resistance 37 so that for all practical purposes, the anodes 81 and 83 are electrically tied together at the frequencies of the I.F. signal. Amplified I.F. signal information which flows to either or both of the anodes 81 and 83 is passed through the resonant circuit 57; the resonant circuit 57, being sharply resonant to the carrier frequency of the I.F. signal, thereupon develops a synchronous demodulating signal. The synchronous demodulating signal from the resonant circuit 57 is induced into the coil 91 which is centertapped to ground and which has one end-terminal 93 connected to the deflection plate 85 and the other end-terminal 95 connected to the other deflection plate 87; the synchronous demodulating signal is thereby applied to the deflection plates 85 and 87 in push-pull.

The synchronous demodulating signal developed across the deflection plates 85 and 87 drives the deflection plates 85 and 87 in push-pull. Feedback of the demodulating signal which might lead to oscillation is not possible since the voltage across the deflection plates 85 and 87 affects only the current division between the two anodes 81 and 83 and not the total current. The synchronous demodulating signal applied in push-pull to the deflection plates 85 and 87 is automatically clipped with respect to the current arriving at either anode since for beam deflection in one direction, the current to that anode falls to zero while for beam deflection in the other direction, the anode current cannot increase beyond the already existing value of current.

Signal mixing between the I.F. signal being amplified and the demodulating signal information induced into the electron stream by way of the deflection plates 85 and 87, develops a demodulated signal across the resistor 37 and therefrom at the output terminal 21.

As previously noted in connection with the circuit of FIGURE 2, the RF choke 45 which is connected between the resistor 37 and the output terminal 21 prevents I.F. signal information from being developed at the output terminal 21; the condenser 47 is used to by-pass to ground any I.F. signal information passed through the RF choke 45.

In the circuit of FIGURE 6, the condenser 61 is a neutralizing condenser for the purpose of neutralizing any information fed back from the anode to the control grid of tube 80 by way of interelectrode capacitances. The coil 63 coupled between the potential terminal 65 and the third grid of the beam deflection tube 80 is used to provide a high impedance between the potential terminal 65 and the third grid so that the reactance of the condenser 61 will not be short-circuited by the low impedance of any circuit furnishing a potential to the potential terminal 65.

Figure 7:
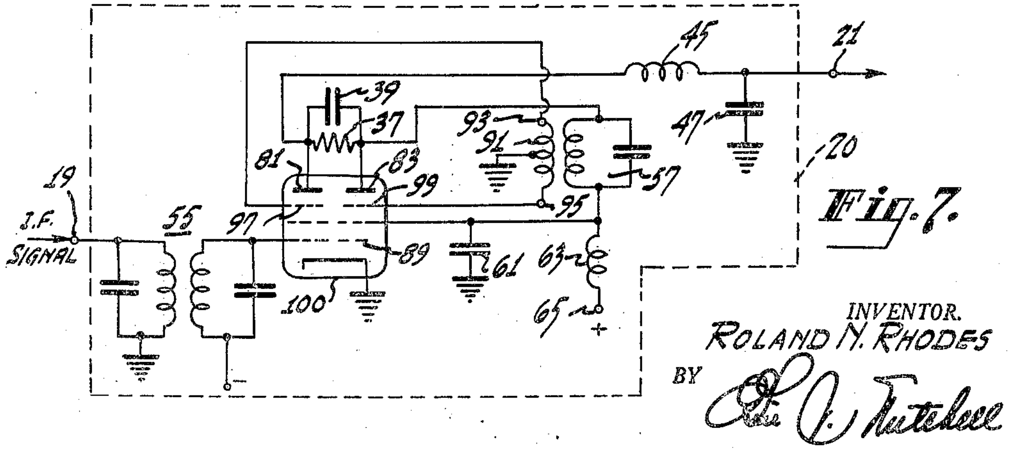

FIGURE 7 is another form of push-pull, self-synchronous demodulating amplifier which does not use deflection plates as used in the circuit of FIGURE 6, but which uses modulating grids 97 and 99 to modulate currents passing to either of the output electrodes 81 and 83. The tube 100 of FIGURE 7 is connected into a circuit similar to that of FIGURE 6. The amplified synchronous demodulating signal is applied in push-pull to the third grids 97 and 99 by way of the center-tapped coil 91. In virtue of the fact that, as the potential of the third grid 97 increases, the potential of the third grid 99 will decrease and vice versa; the synchronous demodulating signal will not be redeveloped into the output circuit of the tube 100 since the total I.F. current passed through the resonant circuit 57 will not be affected by the synchronous demodulating signal, oscillations are prevented from developing.

The synchronous demodulating amplifier 20 of FIGURE 7 will thereupon produce a demodulated signal at the output terminal 21.

*Series self-synchronous demodulating amplifier*

Figures 8, 9:
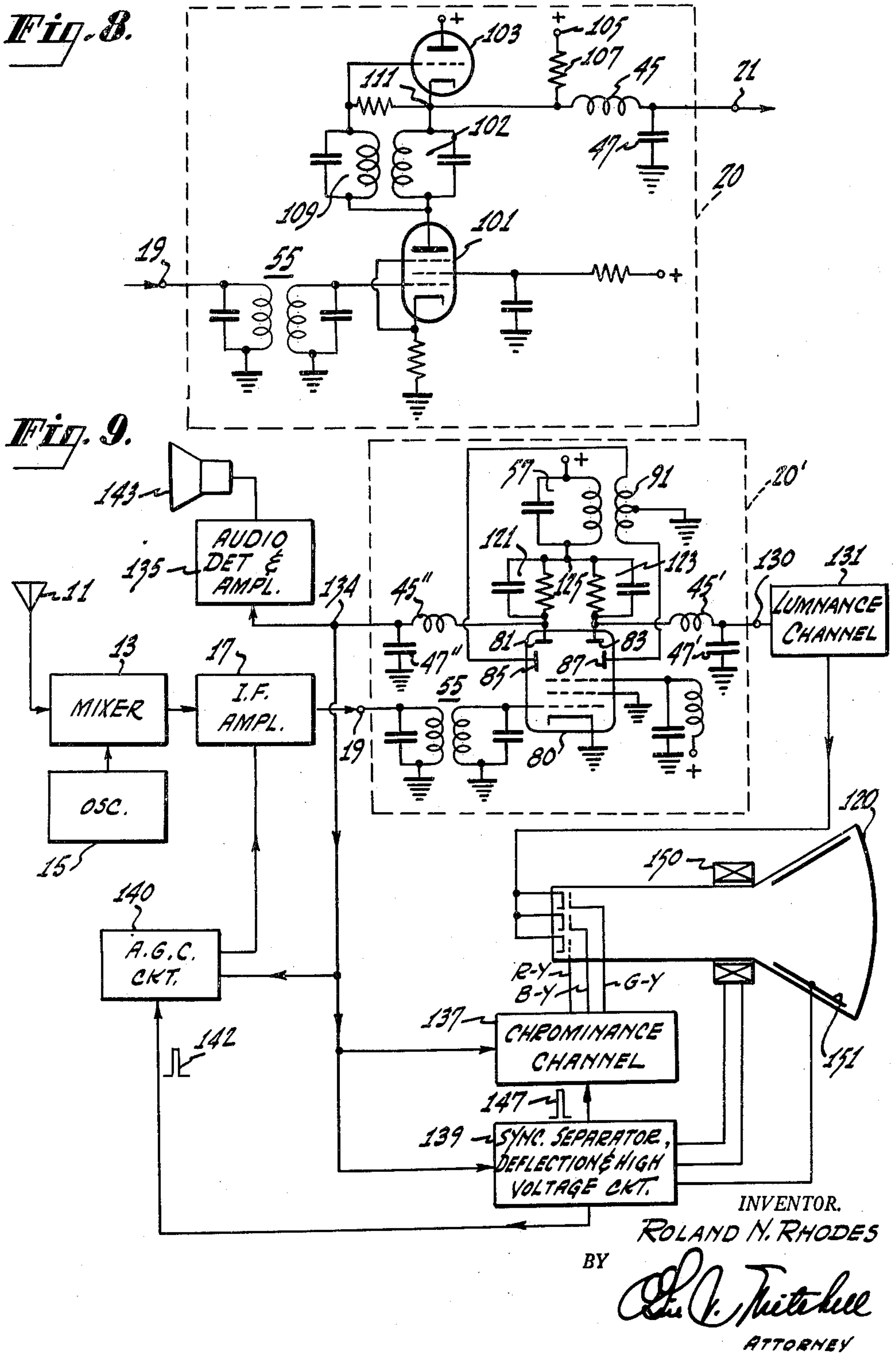

The schematic diagram shown in FIGURE 8 illustrates one form of self-synchronous demodulator detector wherein a pair of electron tubes are connected in series in a series type of arrangement.

The I.F. signal is applied from the input terminal 19 to the first control grid of a pentode 101 by way of the band pass filter 55.

The anode of the pentode 101 is coupled by way of the resonant circuit 57 to the cathode of the triode 103. The resonant circuit 57 is resonant in the frequency range of the I.F. signal. The anode of the triode 103 is connected to a potential terminal. The cathode of triode 103 is connected to a potential terminal 105 by way of the load resistance 107. The control grid of triode 103 is coupled to the anode of the pentode 101 by way of the resonant circuit 109 which is sharply resonant at the carrier frequency of the I.F. signal and which is inductively coupled to the resonant circuit 57. The cathode of triode 103 is coupled by way of the RF choke 45 to the output terminal 21.

The circuit of FIGURE 8 operates in the following fashion. The current which is derived from the pentode 101 to the output terminal 21 is in the opposite direction to the current which is derived from the triode 103. Therefore, the total current at the terminal 111 and therefore through the resistor 107 will be equal to the pentode current minus the triode current. The coupling of the resonant circuit 109 to the control grid of the triode 103 provides that, as the current through pentode 101 increases responsive to an increase in the amplitude of the I.F. signal, the current passing to the terminal 111 from the triode 103 will decrease; conversely, as the current from the pentode 101 through the terminal 111 responsive to a decrease in amplitude of the carrier component of the I.F. signal, the carrier component current comprising the synchronous demodulating signal from the triode 103 through the terminal 111 will decrease. In this way the total current at the terminal 111, and therefore at the output terminal 111 relative to the synchronous demodulating signal, will remain substantially constant. However, as a result of an amplified I.F. signal passed through the triode 103 and a synchronous demodulating signal applied to the control grid of that triode 103, signal mixing of these signals will take place in triode 103 thereupon producing a current across the resistor 107 and therefore a voltage at the output terminal 21 which comprises the demodulated signal which is derived from the I.F. signal.

In view of the fact that the current, relative to synchronous demodulating signal information at the terminal 111, is maintained substantially constant, the self-synchronous oscillating amplifier circuit shown in FIGURE 8 will not oscillate.

*Push-pull self-synchronous demodulating amplifiers in color television receivers*

The present invention is of particular use in color television receivers since a variety of signals are needed in such television receivers. The transmitted signal from a television station which broadcasts color television signals, includes not only a luminance signal, which conveys brightness information and is the counterpart of monochrome information transmitted by a monochrome signal broadcasting station, but also a chrominance signal, color synchronizing bursts, horizontal and vertical deflection synchronizing pulses, and also an audio-modulated frequency-modulated carrier.

The chrominance signal contains modulations representative of each of a plurality of color difference signals which are transmitted at different phases in the chrominance signal relative to a reference phase and which may be demodulated by synchronous demodulation. The color synchronizing bursts convey reference phase information so that synchronous demodulation of color difference signals can be produced in a color television receiver.

If a color kinescope, such as the color kinescope of FIGURE 9 bearing the numeral 120, is utilized in a color television receiver to reproduce a transmitted image in each of red, green, and blue primary colors, then the signals which must be applied to that color kinescope 120 must be in the form of a luminance signal or Y signal, and also of color difference signals of the $R-Y$, $B-Y$, and $G-Y$ variety, where R, B, and G, denote red, blue, and green, respectively.

The various signals comprising the color television signal have different bandwidths. For example, a luminance signal in general has frequency components developed in the range between 0 and 4.2 mc. The chrominance signal, comprising a modulated subcarrier in which the original carrier information is suppressed, has a frequency range from substantially 2 to 4.2 mc. The color synchronizing burst has a frequency of 3.58 mc., the frequency being the nominal frequency of the modulated subcarrier; the color synchronizing bursts are transmitted during the retrace interval on the "back porch" of the horizontal synchronizing pulses. The horizontal and vertical synchronizing pulses constitute principally lower frequency information having signal components which are in a frequency range well below the frequency range of the chrominance signal. The sound-modulated frequency-modulated carrier is transmitted on a carrier 4½ mc. removed from the picture carrier in a broadcasted signal.

In the color television receiver of FIGURE 9, the incoming signal is received at the antenna 11 and is processed in the mixer 13. In the mixer 13 an oscillatory signal developed by an oscillator 15 is mixed with the incoming modulated signal to develop an I.F. signal which is amplified in the I.F. amplifier 17. The output signal of the I.F. amplifier 17, constituting an I.F. signal, is applied to the self-synchronous demodulating amplifier 20'. The reference numeral assigned to the self-synchronous demodulating amplifier 20' of FIGURE 9 is primed in view of the fact that more than one output signal is possible from such a circuit of the invention in a manner to be described in detail.

At the output terminal 19 of the I.F. amplifier 17, an I.F. signal is developed which is a modulated I.F. carrier having sidebands representing the luminance signal, the chrominance signal, the color synchronizing bursts, the vertical and horizontal picture deflection synchronizing pulses and the audio-modulated frequency-modulated carrier. The I.F. signal is applied to, say, a beam deflection tube 80 which is included in one circuit of the present invention.

The self-synchronous demodulating amplifier 20' of FIGURE 9 employs use of a beam deflection tube so that one type of operation of the present invention may be described; it is to be appreciated by one skilled in the art that other forms of tubes and tube circuits, such as those described, for example, in FIGURES 7 and 8 of the specification, can also be used without departing from the present invention and without giving up the benefits of the invention.

The circuit including the beam deflection tube 80 of the self-synchronous demodulating amplifier 20' differs from the circuit shown in FIGURE 6 in that each of the anodes 81 and 83 have separate video circuits 121 and 123, respectively; each of the load circuits 121 and 123 consist of a resistance load shunted by a condenser load, the condenser loads comprising by-pass elements to prevent the I.F. signal from being attenuated by each of the resistive loads. The anode loads 121 and 123 are connected to a common point 125 which in turn is connected by way of the resonant circuit 57 to a potential terminal. A center-tapped coil 91 which is excited by a synchronous demodulating signal developed in the resonant circuit 57 is connected in a manner already described in connection with the circuit of FIGURE 6 to the beam deflection plates 85 and 87 to cause nonoscillating synchronous detection of the amplified I.F. signal to take place with demodulated color television signal thereupon developed in each of the anode loads 121 and 123. As a result of the anodes of the beam deflection tube 80 being connected to different anode loads and as a result of the beam deflection electrodes being driven in push-pull, demodulated signals developed across the anode loads 121 and 123 will have opposite polarities.

The anode load 123 is coupled by way of the choke 45' and the by-pass condenser 47' to the luminance channel 131 which applies amplified luminance signal information to the cathodes of the color kinescope 121.

The anode load 121 is connected by way of the RF choke 45'' and the by-pass condenser 47'' to the audio detector and amplifier 135, to the chrominance channel 137 and to the sync separator deflection and high voltage circuit 139; the demodulated signal produced across the anode load 121 is also applied to the AGC circuit 140.

In the audio detector amplifier 135, using, for example, an intercarrier sound circuit, the audio information is demodulated and amplified and applied therefrom to the loudspeaker 143.

In the AGC circuit 140, the amplitudes of the deflection synchronizing pulses are sampled responsive to sampling pulses produced by the sync separator, deflection and high voltage circuit 139, to produce a voltage having an amplitude corresponding to the signal strength of at least the low frequency range of the color television signal; this control signal is thereupon used to control the gain of the I.F. amplifier 17 in a manner well known in the art.

The color television signal is applied to the chrominance channel 137, to which is also applied a gate pulse 147 having a duration interval substantially in coincidence with each color synchronizing burst. The chrominance channel separates the chrominance signal from the color television signal, separates the color synchonizing burst from the color television signal, derives color demodulating signals therefrom, and applies the color demodulating signals and the chrominance signal to suitable demodulator circuits to produce $R-Y$, $B-Y$, and $G-Y$ color difference signals; the latter-named signals are thereupon applied to corresponding control grids of the electron guns of the color kinescope 120. For a discussion of circuits which constitute a typical chrominance channel, see, for example, the article by Kirkwood and Torre entitled "The Commercial CT-100 Color Television Receiver," published in the September 1954 issue of the RCA Review.

The color television signal is applied to the sync separator, deflection and high voltage circuit 139, which, responsive to the horizontal and vertical synchronizing pulses, develops vertical and horizontal deflection currents which are passed through the yoke 150 and which also develops a high voltage which is applied to the second anode 151 of the color kinescope 120; as previously pointed out, the sync separator, deflection, and high voltage circuit 139 also develops the gate pulse 147 and also the pulses 142.

In the push-pull self-synchronous demodulating amplifier circuit 20', the anode loads 121 and 123 may have different characteristics to accommodate different demands made by signals of different bandwidth required from the color television signal. For example, the resistive portion of the anode load 123 may have one value of resistance so that the color television signal information developed across the anode load 123 will be of sufficient bandwidth to accommodate all of the luminance signal component. The resistive portion of the anode load 121, on the other hand, is assigned another value of resistance so that the even greater bandwidth of a color television signal which includes both all low-frequency components and also the audio-modulated frequency-modulated carrier will be accommodated.

In the case, for example, where only the chrominance signal and audio-modulated frequency-modulated carrier are to be derived from the anode load 123 of the push-pull self-synchronous demodulating amplifier which feeds the luminance channel 131, then the signal information which is derived from the anode load 121 and which is intended to derive only the sync separator deflection high voltage circuit and the AGC circuit may use a resistance of very large value so that the bandwidth of the synchronous detection action of the portion of the self-synchronous demodulating amplifier 20′ driving the anode load 121 will be small though sufficiently large to accommodate those components which are required by the AGC circuit and the sync separator circuits.

Figure 10:
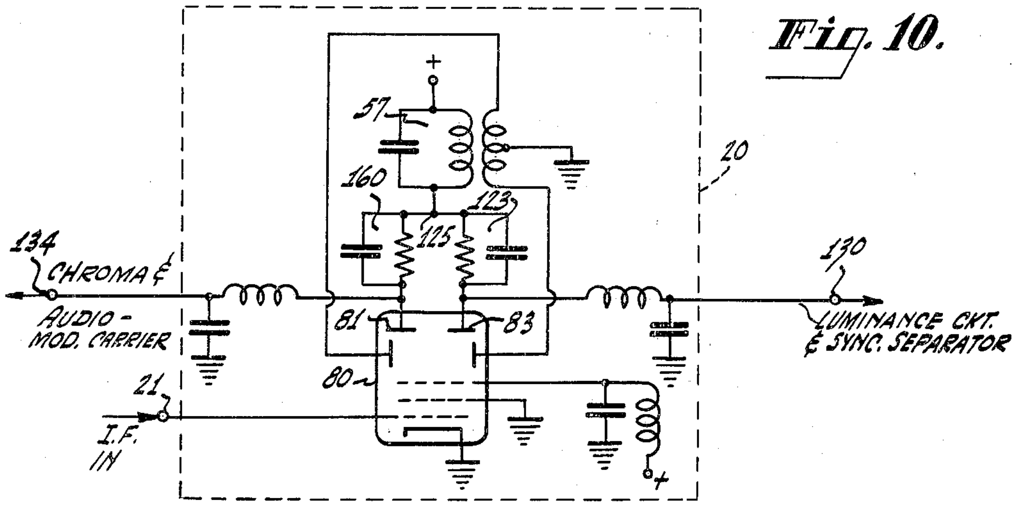
FIGURES 10 and 11 are schematic diagrams of different forms of self-synchronous demodulating amplifiers for producing different signals from a color television signal.

The push-pull self-synchronous demodulating amplifier circuit of FIGURE 10 illustrates one arrangement of a push-pull synchronous demodulator which uses a pair of output electrodes and which drives different circuits of vastly different bandwidths. For example, the anode 83 of the beam deflection tube 80 is coupled to an anode load 123 constituting a resistive load which is shunted by a condenser. The anode load 123 uses a suitably small resistance so that the synchronous detection action into the anode load 123 will be a wideband action thereby producing a full bandwidth of color television signal information including both the entire luminance signal and also the low-frequency horizontal and vertical deflection synchronizing signals at the output terminal 130.

The anode 81 of the beam deflection tube 80 is coupled to a resonant circuit 160 which has a bandwidth sufficient to accommodate all signal components transmitted in the frequency range of both the chrominance signal and also the audio-modulated frequency-modulated carrier. Only the chrominance signal and the audio-modulated, frequency-modulated carrier will therefore be demodulated as a result of the synchronous detection to therefrom produce the chroma and the audio-modulated frequency-modulated carrier at the output terminal 134; the color synchronizing bursts will also be developed at that terminal. If only the chrominance signal is required from the circuit coupled to the anode 81, then the resonant circuit 160 should be designed to have a bandwidth sufficient to accommodate only those components of the color television signal which constitute the desired chrominance signal information.

Figure 11:
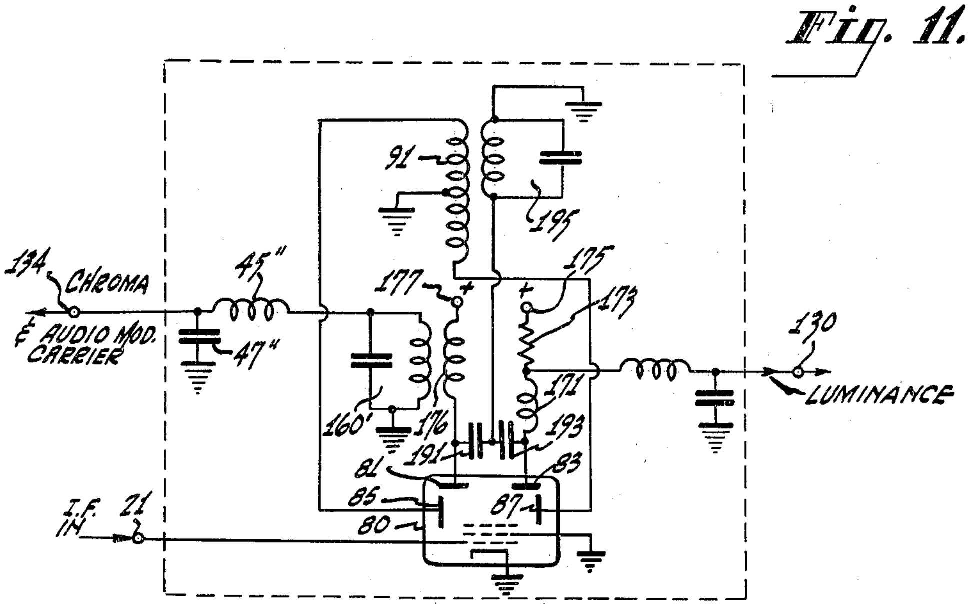

FIGURE 11 shows an alternative arrangement of the circuit of FIGURE 10.

In the push-pull self-synchronous demodulating circuit of FIGURE 11, the anode 83 is coupled by an anode load comprising the coil 171 serially connected with a resistance 173 to a potential terminal 175; the coil 171 and the resistance 173 are designed to give wideband response to any information developed at the anode 83.

The anode 81 is coupled by way of a coil 176 to a potential terminal 177; the coil 176 is inductively coupled to a resonant circuit 160′ which has a bandwidth sufficiently large to accommodate all signal components which lie in the frequency ranges of the chrominance signal and the audio-modulated, frequency-modulated carrier in the color television signal. Both of the last-named signals will be produced at the output terminal 134.

A pair of condensers 191 and 193 are connected in series between the anodes 81 and 83 with the mid-terminal of these condensers thereupon coupled to a coil 195. The coil 195 is coupled to drive a center tapped coil 91, which drives the beam deflection plates 85 and 87 in push-pull with a synchronous demodulating signal. One advantage of the circuit of FIGURE 11 is that the amplified I.F. signal is not shunted through the anode loads which are each supplying different types of demodulated signal information to the respective circuits; the amplified I.F. signal is coupled by way of the condensers 191, 193 directly to those circuits which are used for developing a synchronous demodulating signal and for applying the synchronous demodulating signal in push-pull to the deflection plates 85 and 87 of the beam deflection tube 80.

Whereas each of the push-pull self-synchronous demodulating amplifiers 20′ of FIGURES 9 through 11 have shown the use of beam deflection tubes for producing different demodulated color television signals from an I.F. signal, it is to be appreciated that other types of tubes, such as the ones shown in FIGURE 7 or semi-conductor devices may also be used.

*Carrier balanced self-synchronous demodulating amplifier*

When an I.F. signal, to be demodulated, is not of sufficient amplitude to cause a self-synchronous demodulating amplifier, to which it is applied, to develop a synchronous demodulating signal of sufficient magnitude to cause amplitude limiting or clipping of the latter signal in the amplifier, another technique may be used to prevent variations in detected synchronous demodulating signal amplitude from contaminating the demodulated signal.

FIGURE 12 is a schematic diagram of a self-synchronous demodulating amplifier 20 which uses a "carrier balance" technique in the absence of clipping of the synchronous demodulating signal. The circuit of FIGURE 12 is similar to that of FIGURE 2; the circuit of FIGURE 12, however, includes an amplitude detector comprising the rectifier 203 and the R-C network 204 which is coupled to the resonant circuit 33 by way of condenser 201. The amplitude detector detects the amplitude variations of the synchronous demodulating signal and produces a signal representative thereof at the terminal 207; this signal will be identical in waveform but opposite in polarity to any detected synchronous demodulating signal variation which is produced at the output terminal 21 with the demodulated signal. The proper magnitude of the signal at the terminal 207 is thereupon coupled by way of condenser 205 and resistor 206 to the output terminal 21 to cancel the undesired signal variation at the output terminal 21.

Having described the invention, what is claimed is:

1. A demodulator for demodulating a signal including a carrier frequency component and at least one sideband, comprising: an electron discharge device including signal input means, demodulating signal input means, and output means, means to apply an input signal to be demodulated to said signal input means, a carrier frequency output circuit tuned to said carrier frequency component and coupled to said output means, whereby the carrier component of said input signal appears in amplified form in said output circuit, a non-oscillating feedback arrangement including coupling means to couple said amplified carrier component from said output circuit to said demodulating signal input means, said coupling means being adjusted so that the phase of the amplified carrier component in said discharge device is along the in-phase axis of the carrier component of the input signal, whereby synchronous detection occurs in said discharge device, and a detected signal output circuit coupled to said output means.

2. A demodulator for demodulating a signal including a carrier frequency component and at least one sideband, comprising: an electron discharge device providing an electron discharge path and including signal input means near the beginning of said path, demodulating signal input means near the end of said path, and output means, means to apply an input signal to be demodulated to said signal input means, a carrier frequency output circuit tuned to said carrier frequency component and coupled to said output means whereby the carrier component of said input signal appears in amplified form in said output circuit, a non-oscillatory feedback arrangement including coupling means to couple said amplified carrier component from said output circuit to said demodulating signal input means, said coupling means being adjusted so that the phase of the amplified carrier component in said discharge device is along the same axis as the phase of the carrier component of the input signal whereby synchronous detection occurs in said discharge device, and a detected signal output circuit coupled to said output means.

3. A demodulator for demodulating a signal including a carrier frequency component and at least one sideband, comprising: a deflectable beam type electron discharge device including signal input means, demodulating signal input beam deflection means, and output means, means to apply an input signal to be demodulated to said signal input means, a carrier frequency output circuit tuned to said carrier frequency component and coupled to said output means whereby the carrier component of said input signal appears in amplified form in said output circuit, a non-oscillatory feedback arrangement including coupling means to couple said amplified carrier component from said output circuit to said demodulating signal input beam deflection means, said coupling means being adjusted so that the phase of the amplified carrier component in said discharge device and the phase of the carrier component of the input signal lie along a common axis, whereby synchronous detection occurs in said discharge device, and a detected signal output circuit coupled to said output means.

4. In combination: a circuit to provide a modulated carrier having a carrier and sideband components and capable of being demodulated by mixing said modulated carrier with a demodulating signal including said carrier; an electron flow means having a first and second electron flow path, each of said electron flow paths capable of having electron flow controlled by signals applied thereto and capable of mixing a plurality of signals applied thereto; means to introduce modulations representative of said modulated carrier into both electron flow paths, means to derive from said first and second electron flow paths amplified components of said modulated carrier and to further derive therefrom a demodulating signal representing at least the carrier of said amplified modulated carrier, means to modulate the electron flow in one electron flow path with one phase of said demodulating signal which is the same as the phase of said carrier and to modulate the electron flow in the other electron flow path with a phase of said demodulating signal opposite to the phase of said carrier to cause signal mixing of the modulated carrier being amplified and the demodulating signal information in each of said electron flow paths, and means coupled to at least one of said electron flow paths and responsive to signal mixing components produced therein to provide components representative of the modulations of said modulated carrier.

5. In combination: a circuit to provide a modulated carrier having a carrier and sideband components and including a first frequency band, said modulated carrier capable of being demodulated by mixing said modulated carrier with a demodulating signal comprising components including said carrier in a second frequency band substantially smaller than said first frequency band which are derived from said modulated carrier; an electron tube means having electron flow controlled by a plurality of control electrodes and a plurality of output electrodes and operatively connected to cause signal mixing therein responsive to signals applied to different ones of said control electrodes, said signal mixing thereby producing components at said output electrodes; a load circuit coupled to said plurality of output electrodes, means to apply said modulated carrier to one of said plurality of control electrodes to cause amplified components in said second frequency band of said modulated carrier to be developed in said load circuit; means coupled to said load circuit to therefrom derive a demodulating signal comprising said second frequency band of said amplified modulated carrier; means to apply said demodulating signal to the other of said control electrodes to modulate the electron flow to said plurality of output electrodes in different phases all lying along a common axis with the phase of said carrier and to cause signal mixing in said electron tube means between said modulated carrier being amplified and said demodulating signal to produce demodulated signal information in said load circuit.

6. In combination: a circuit to provide a modulated carrier having a carrier and sideband components in a first frequency range and capable of being demodulated by mixing said modulated carrier with a demodulating signal comprising sideband components including said carrier in a second frequency range substantially smaller than said first frequency range, electron tube means having a first and second output electrode and a first and second control electrode for controlling, respectively, the current division between said first and second output electrodes and a third control electrode for controlling the amplitude of current to be controlled by said first and second control electrodes, an output circuit means coupled to said first and second output electrodes and including a resonant circuit means having a frequency characteristic suitable to allow voltage representative of said second frequency range of said modulated carrier to be developed across said resonant circuit means responsive to currents representative of said modulated carrier passing through said resonant circuit means, means to apply said modulated carrier to said third control electrode to produce an amplified modulated carrier in said resonant circuit means, means coupled to said resonant circuit means to derive a demodulating signal comprising said second frequency range of said modulated carrier, means to apply said demodulating signal in one phase to said first control electrode and in an opposite phase to a second control electrode, both phases of said demodulating signal lying along a common axis with the phase of said modulated carrier so as to cause signal components representative of the demodulation of said modulated carrier to be developed in said output circuit and to cause current components in said output circuit to be substantially free of demodulating signal information thereby preventing oscillations from being developed by said electron tube means.

7. In combination: a circuit to provide a modulated carrier having a carrier and sideband components occupying a first frequency range and capable of being demodulated by mixing said modulated carrier with a demodulating signal comprising sideband components including said carrier in a second frequency substantially smaller than said first frequency range of said modulated carrier, an electron tube means having a plurality of control electrodes and output electrodes and operatively connected to cause signal mixing in said electron tube means between different signals applied to different ones of said control electrodes, said signal mixing thereby producing signal mixing components in said output electrodes, an output circuit comprising a resonant circuit in circuit with a resistance means which is shunted by a by-pass condenser means, said resonant circuit having a bandwidth suitable for developing only components in said second frequency range of said modulated carrier responsive to currents representative of said modulated carrier passed through said resonant circuit, means to couple said load circuit to different ones of said output electrodes, means to apply said modulated carrier to a first of said plurality of control electrodes to cause an amplified modulated carrier to be developed across said resonant circuit, means coupled to said resonant circuit to derive a demodulating signal comprising components in said second frequency range of said amplified modulated carrier, means coupled between said demodulating signal deriving means and a second of said control electrodes to apply to said second control electrode a phase of said demodulating signal lying along the inphase axis of said modulated carrier so as to cause signal mixing between said demodulating signal and said modulated carrier being amplified in said electron tube means, whereby, demodulated signal information is developed across said resistance means.

8. In combination: a circuit to provide a modulated carrier having a carrier and sideband components having a first frequency range and capable of being demodulated by mixing said modulated carrier with a demodulating signal comprising sideband components including said carrier in a second frequency range substantially smaller than said first frequency range of said modulated carrier, an amplifier means having an output electrode and a control means, means to apply said modulated carrier to said control means, an electron tube having at least a cathode and a control grid, means coupling said cathode to said output electrode to develop an amplified modulated carrier in said electron tube, said cathode coupling means including means coupled to said control grid to apply said second frequency range of components of said modulated carrier thereto in a phase along the in-phase axis of said modulated carrier applied to said control means, means coupled to said electron tube to derive demodulated signal components resulting from signal mixing of said modulated carrier and of said second frequency range of said modulated carrier provided therein.

9. In combination: a circuit to provide a modulated carrier having a carrier and sideband components and capable of being demodulated by mixing said modulated carrier with a demodulating signal comprising principally said carrier of said modulated carrier, an electron tube having at least a first control grid, a screen grid, a third grid, and an anode, said third grid capable of controlling the distribution of current flowing to said anode and said screen grid responsive to a signal applied thereto; means to apply said modulated carrier to said first control grid, an output circuit coupled to said anode and to said screen grid and including a resonant circuit resonant at the frequency of said carrier, means to derive a demodulating signal comprising principally the carrier of said modulated carrier from said resonant circuit and to couple said demodulating signal to said third grid in a phase lying along the axis of the phase of said modulated carrier as applied to said first control grid, said demodulating signal having an amplitude sufficient to cause amplitude limiting of said demodulating signal in said electron tube and to cyclically alter the current passed to said anode and said screen grid and to said resonant circuit in different phases of the demodulating signal, thereby causing signal mixing of said modulated carrier and said demodulating signal in said electron tube to produce demodulated signal components in said output circuit.

10. In combination: a circuit to provide a modulated carrier capable of being demodulated by mixing said modulated carrier with a demodulating signal comprising principally said carrier component of said modulated carrier; a beam deflection tube having a beam current control electrode, a first and second output electrode and a first and second deflection electrode, said first and second deflection electrode capable of controlling the current distribution between said first and second output electrodes; means to apply said modulated carrier to said beam current control electrode; output circuit means coupled to said first and second output electrodes and including resonant circuit means to develop a demodulating signal representing principally the carrier component of any amplified modulated carrier information produced in said output circuit means; means coupled between said resonant circuit means and to said first and second deflection electrodes to apply said demodulating signal in push-pull phases lying along the phase axis of said modulated carrier to said first and second deflection electrodes whereby demodulated signal components are developed in different polarities at said first and second output electrodes.

11. In combination: a circuit to provide a modulated carrier having a carrier and sideband components capable of being demodulated by mixing said modulated carrier with a demodulating signal comprising principally said carrier component of said modulated carrier; a first amplifier device circuit having an input circuit and an output electrode; means to apply said modulated carrier to said input circuit; a second amplifier circuit; a resonant circuit having a resonance at the frequency of the carrier of said modulated carrier; means to operatively connect said resonant circuit and said second amplifier device to said output electrode to cause an amplified modulated carrier to be developed in said second amplifier device and an amplified carrier component to be developed across said resonant circuit, said connecting means including a circuit common to both said first and second amplifier circuits wherein currents of different polarities are provided by said first amplifier circuits responsive to said modulated carrier applied to said input circuit; means to apply said amplified carrier component developed across said resonant circuit to said second amplifier circuit in a phase lying along the phase axis of the modulated carrier applied to said first amplifier device to cause signal mixing of said amplified modulated carrier and said amplified carrier component therein to develop therefrom demodulated signal components at said common circuit.

12. In combination: a circuit to provide a modulated carrier having a carrier and sideband components and capable of being demodulated by mixing said modulated carrier with a demodulating signal comprising principally the carrier component of said modulated carrier, an electron flow means having a first and second electron flow path, each of said electron flow paths capable of being controlled by applied signals and capable of mixing any of a plurality of signals applied thereto, means to introduce modulations representative of said modulated carrier into both of said electron flow paths, means to derive from said first and second electron flow paths a demodulating signal representing principally the carrier components of said modulated carrier, means to modulate the electron flow along one electron flow path with one phase of said demodulating signal and to modulate the electron flow along the other electron flow path with an opposite phase of said demodulating signal, one of said phases of the demodulating signal being in phase with said modulated carrier and the other of said phases of the demodulating signal being in phase opposition to said modulated carrier so as to cause signal mixing of said modulated carrier being amplified and demodulating signal information in each of said electron flow paths, and means coupled to at least one of said electron flow paths and responsive to signal mixing components produced therein to provide components representative of the modulations of said modulated carrier.

13. In combination: a circuit to provide a modulated carrier having a carrier and sideband components and capable of being demodulated by mixing said modulated carrier with a demodulating signal comprising the carrier components of said modulated carrier, electron tube means having a first and second output electrode and a first and second control electrode for controlling, respectively, the current division between said first and second output electrodes and an input circuit for controlling the amplitude of current to be controlled by said first and second control electrodes, a first output circuit means having a first bandwidth coupled to said first output electrode, a second output circuit having a second and substantially different bandwidth coupled to said second output electrode, a resonant circuit means coupled to said first and second output electrodes and having a frequency characteristic suitable to allow voltage representative of principally said carrier component to be developed across said resonant circuit means responsive to currents representative of said modulated carrier passing through said resonant circuit means, means to apply said modulated carrier to said third control electrode to produce a demodulating signal across said resonant circuit means, means to apply said demodulating signal in phase with said modulated carrier to said first control electrode and in an opposite phase to said second control electrode to cause signal components representative of demodulation components of said modulated carrier in a first frequency range to be developed in said first output circuit and cause signal components representative of demodulation components of said modulated carrier in a second frequency range to be developed across said second output circuit.

References Cited in the file of this patent

UNITED STATES PATENTS

| | | |
|---|---|---|
| 2,060,142 | Urtel et al. | Nov. 10, 1936 |

| | | |
|---|---|---|
| 2,269,688 | Rath | Jan. 13, 1942 |
| 2,494,795 | Bradley | Jan. 17, 1950 |
| 2,497,290 | Bradley | Feb. 14, 1950 |
| 2,504,626 | Bell | Apr. 18, 1950 |
| 2,523,043 | Metcalf | Sept. 19, 1950 |
| 2,779,818 | Adler et al. | Jan. 29, 1957 |

FOREIGN PATENTS

| | | |
|---|---|---|
| 48,758 | Netherlands | July 15, 1940 |
| 714,528 | Great Britain | Sept. 1, 1954 |

OTHER REFERENCES

"Beam-Deflection Tube," Adler et al., Electronics, May 1954, pp. 148–151.